US005523631A

United States Patent [19]
Fishman et al.

[11] Patent Number: 5,523,631
[45] Date of Patent: Jun. 4, 1996

[54] CONTROL SYSTEM FOR POWERING PLURAL INDUCTIVE LOADS FROM A SINGLE INVERTER SOURCE

[75] Inventors: Oleg S. Fishman, Maple Glen, Pa.;
Simeon Z. Rotman, Englewood, N.J.;
Walter P. Gazdzik, Newtown, Pa.

[73] Assignee: Inductotherm Corp., Rancocas, N.J.

[21] Appl. No.: 112,819

[22] Filed: Aug. 25, 1993

[51] Int. Cl.[6] .................................................. H05B 6/04
[52] U.S. Cl. ............................ 307/38; 219/662; 219/664; 307/39; 373/104
[58] Field of Search ................................. 307/31, 32, 33, 307/34, 35, 38, 39, 40, 41; 373/104, 108; 219/661, 662, 663, 665, 666

[56] References Cited

U.S. PATENT DOCUMENTS

| | | |
|---|---|---|
| 1,849,309 | 3/1932 | Northrup . |
| 3,955,061 | 5/1976 | Roehrman .............................. 219/10.77 |
| 4,011,430 | 3/1977 | Witkin et al. ............................ 219/486 |
| 4,280,038 | 7/1981 | Havas et al. ........................... 219/10.77 |
| 4,695,316 | 9/1987 | Cartlidge ................................ 75/10.14 |
| 4,866,592 | 9/1989 | Fujii et al. ................................ 363/98 |
| 5,038,267 | 8/1991 | De Doncker et al. ..................... 363/89 |
| 5,079,399 | 1/1992 | Itob et al. ............................... 219/10.77 |
| 5,120,936 | 6/1992 | Shyu et al. ............................... 219/497 |
| 5,165,049 | 11/1992 | Rotman .................................... 323/212 |
| 5,256,905 | 10/1993 | Striek et al. .............................. 307/34 |
| 5,272,719 | 12/1993 | Cartlidge et al. ........................ 373/138 |
| 5,349,167 | 9/1994 | Simcock .................................. 219/662 |

*Primary Examiner*—William M. Shoop, Jr.
*Assistant Examiner*—Jonathan Kaplan
*Attorney, Agent, or Firm*—Seidel, Gonda, Lavorgna & Monaco

[57] ABSTRACT

A control system for controlling overshoot and undershoot power values when switching power from a single inverter power source to a plurality of inductive loads, or a single load having a plurality of zones, having different resonant frequencies. The control system causes a preselected amount of power to be drawn from the inverter power source and delivered to the loads, or zones in a time-shared manner. The control system varies the phase shift between load voltage and load current and selectably adjusts the amount of variation in response to overshoot and/or undershoot of power drawn from the inverter and delivered to a load or zone which can occur when switching between loads or zones.

32 Claims, 8 Drawing Sheets

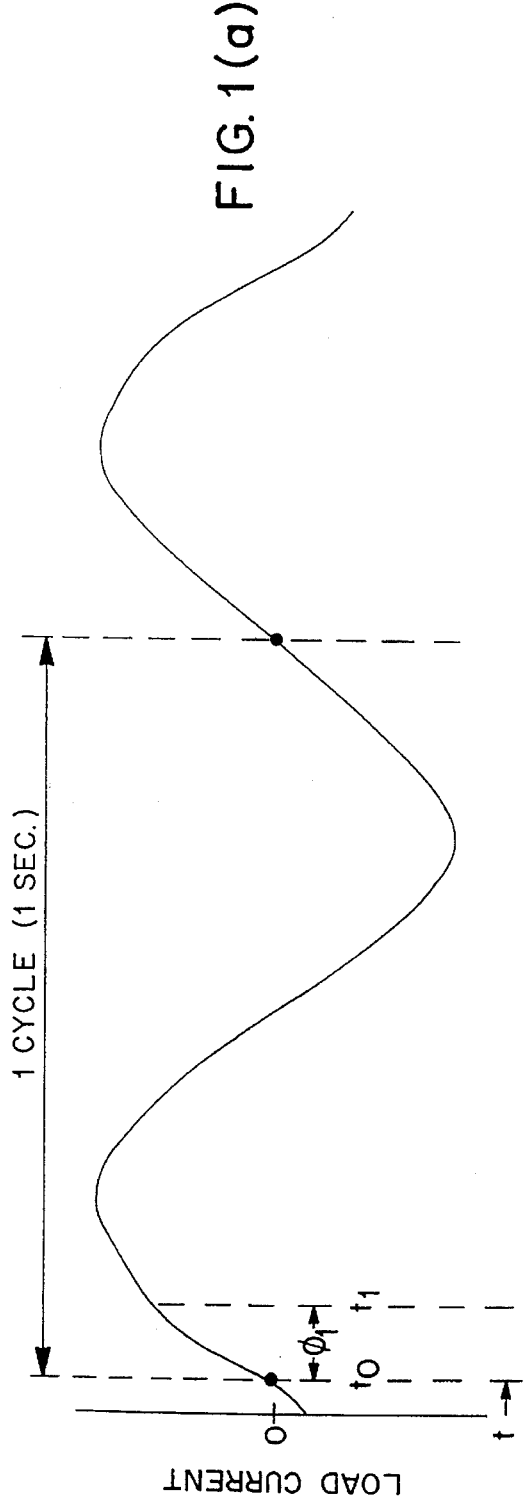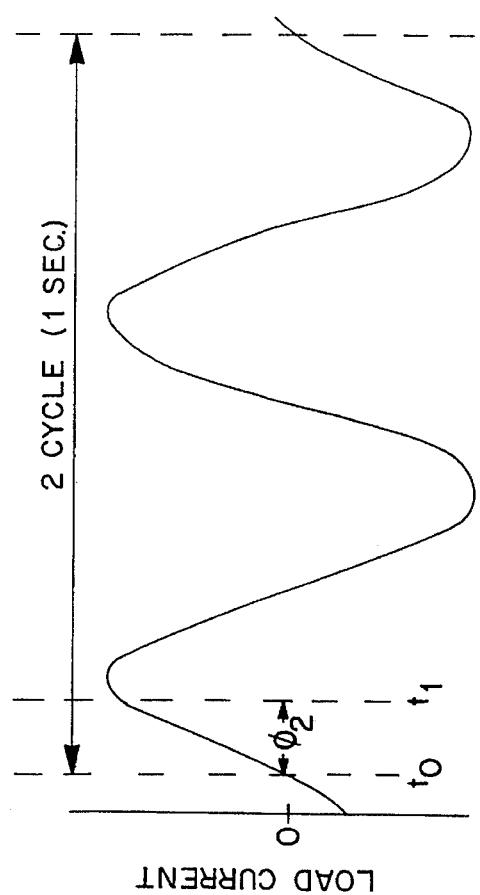

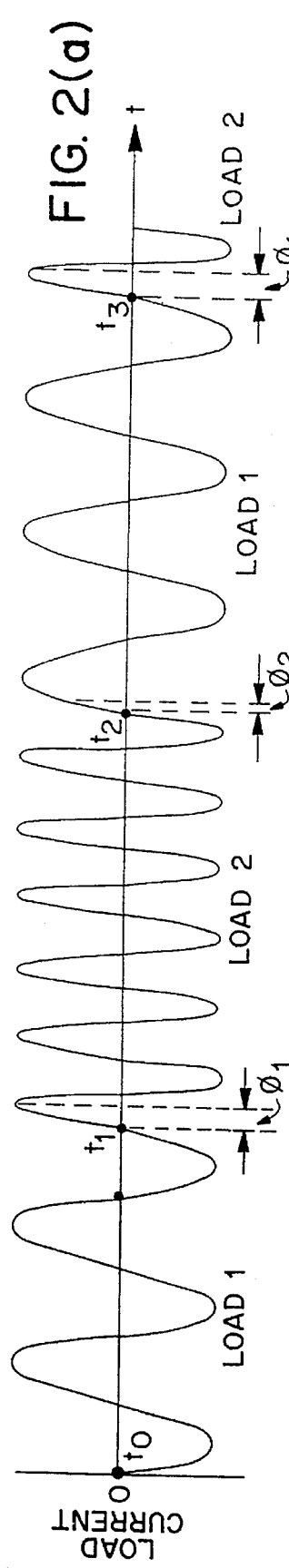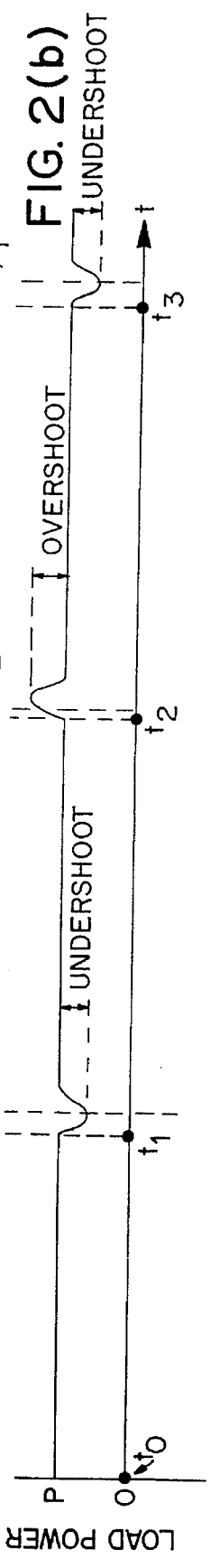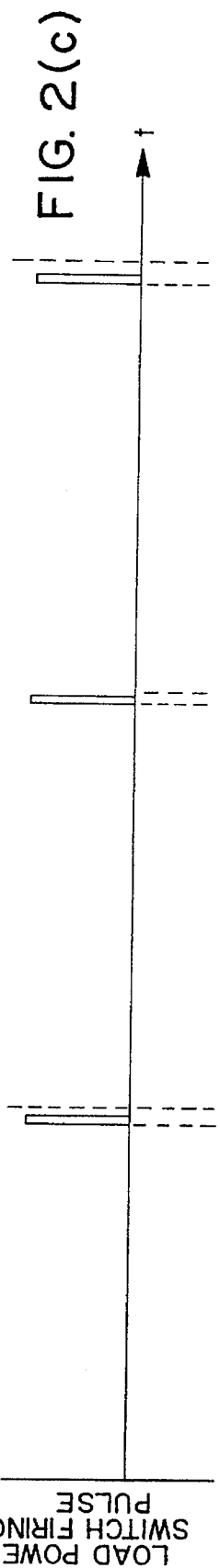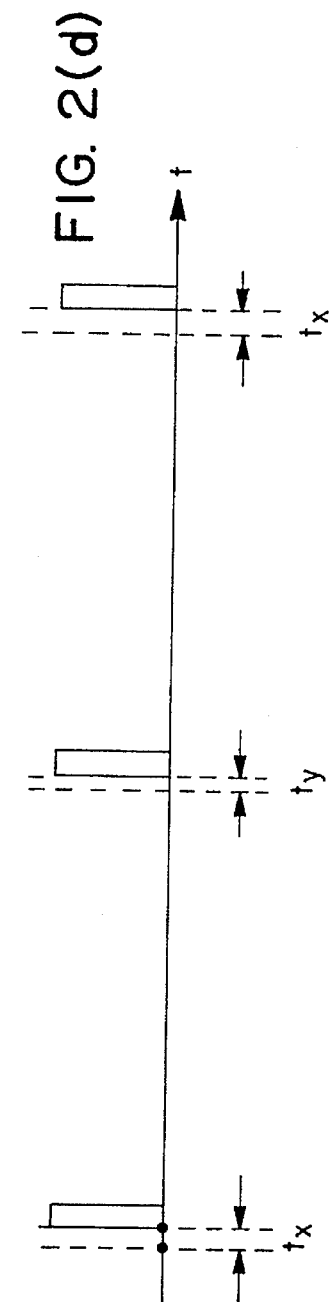

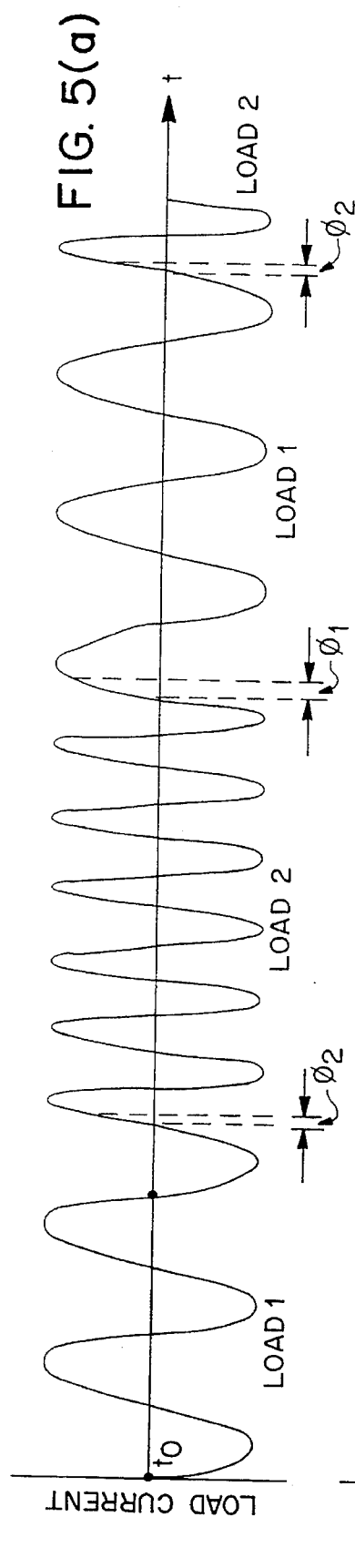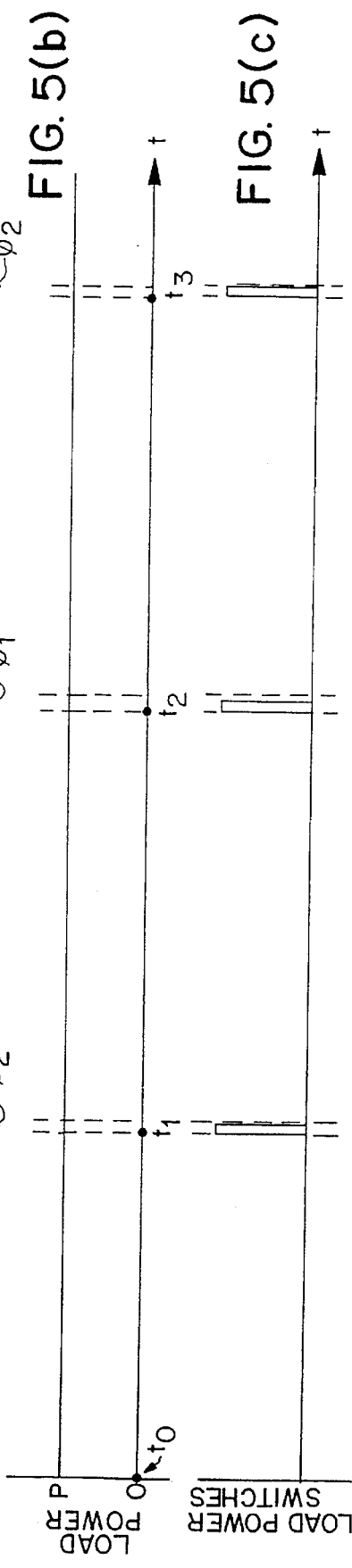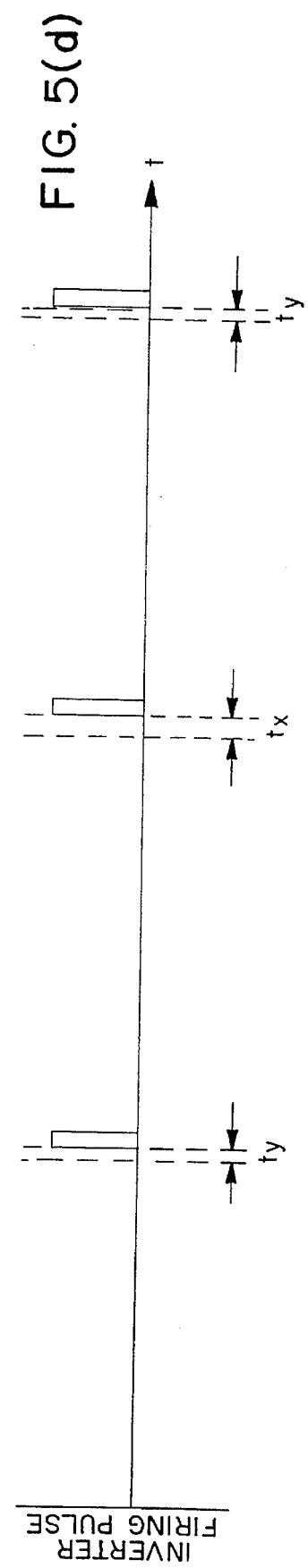

CONTROL SYSTEM FOR POWERING PLURAL INDUCTIVE LOADS FROM A SINGLE INVERTER SOURCE

FIELD OF THE INVENTION

The present invention relates to apparatus and a method for distributing power from a single inverter power source to plural inductive loads and controlling timing of the delivery of the power to the plural inductive loads. The invention varies the phase shift between load voltage and load current and selectably adjusts the amount of variation in response to overshoot and/or undershoot of power output which can occur when switching between loads. The invention is particularly useful in distributing power to plural induction furnaces or to plural zones of a single inductive lead but is by no means limited to such uses.

BACKGROUND OF THE INVENTION

Induction heating involves the heating of a nominally electrically-conducting material (i.e., a metal charge) by eddy currents induced by a time-varying electromagnetic field. Typically, the metal charge is placed in a furnace comprising a refractory crucible surrounded by a liquid-cooled copper coil. Electrical power in the form of alternating current from 50 Hz to 60,000 Hz is supplied to the coil from a suitable power supply. This creates an alternating electromagnetic field around the coil. Heat is produced in the metal charge by means of the eddy currents induced in the charge by the electromagnetic field surrounding the coil.

One type of power source for supplying the high frequency ac is a solid state power supply which utilizes high-power thyristor solid-state devices such as silicon-controlled rectifiers (SCRs). A block diagram of a typical induction heating apparatus (e.g., an induction furnace) and an inverter power supply for the furnace which employs SCRs is described and depicted in FIGS. 1 and 2 of U.S. Pat. No. 5,165,049. That patent is herein incorporated by reference in its entirety.

An induction furnace is one type of inductive load. U.S. Pat. No. 5,165,049 describes the problem of matching the resonant frequency of the inductive load with the resonant frequency of the inverter power supply so as to maximize energy transfer therebetween, in view of the constantly changing resonant frequency of the load and the need to avoid making the frequencies exactly identical. If the frequencies are made identical, the power supply will short out for reasons discussed in that patent. As that patent also describes, the resonant frequency of the load constantly varies. For example, the resonant frequency of a metal charge in a furnace varies as the composition changes and as it is heated, cooled, and as metal is added to or removed from the crucible. U.S. Pat. No. 5,165,049 also discloses circuitry for solving the problem of identical frequency of power supply and load by varying the phase difference between the current and voltage in the load in response to the resonant frequency of the load. The circuitry monitors zero-crossings of the current in the inverter, and generates a time delay before the inverter SCRs are fired in such a way that the output power level is maintained and at least a minimum phase shift $\phi$ is always maintained between current and voltage delivered to the load. In this manner, the SCR firing frequency (the inverter frequency) will always be different from the resonant frequency of the load.

As described in U.S. Pat. No. 5,165,049, the power transferred from the inverter to the furnace (assuming that the current is a sine wave and the voltage a square wave, as would be the case with an ideal inverter-type power supply) will be equal to:

$$P=(2/\pi) \times (VI \cos \phi) \tag{Equation 1}$$

where:
V=inverter voltage ($=V_{DC}$ for a full-bridge inverter)
I=amplitude of inverter current
$\phi$=phase shift or phase angle between voltage and current For $\phi$ between 0° and 90°, an increase in $\phi$ will cause a decrease in power transferred to the furnace. Maximum power transfer will occur when $\phi$=0 (i.e., when cos $\phi$=1). However, as explained in U.S. Pat. No. 5,165,049, $\phi$ should not be allowed to reach zero so as to avoid shorting out the power supply. The control system in U.S. Pat. No. 5,165,049 maintains $\phi$ at a value safely distanced from zero (i.e., the minimum phase shift referred to above), but as close to zero as possible so that cos $\phi$ is as large as possible, thereby ensuring the maximum possible power transfer.

When the resonant frequency of the load varies, such as when there is a change in the composition, temperature or amount of metal charge, the control circuitry in U.S. Pat. No. 5,165,049 readjusts the phase angle $\phi$ to maintain it at its optimum value for maximum power transfer.

FIGS. 1(a) and FIGS. 1(b) herein depict a simplified example for illustration purposes only of load current waveforms at different periods of time.

FIG. 1(a) shows time period $T_1$ wherein the resonant frequency of the load is 1 Hz. The phase angle (i.e., the time delay between a zero crossing at $t_0$ and the firing pulse at $t_1$) is $\phi_1$. In this example, $\phi_1$ is approximately 36° (the full cycle representing 360°), yielding a power transfer value of approximately 0.81 (cos $\phi$=cos 36°=0.81).

FIG. 1(b) shows time period $T_2$ wherein the resonant frequency of the load has changed to 2.0 Hz due to some change in the metal charge (e.g., composition, temperature or amount). In reality, a 100% change in resonant frequency is unlikely to occur over short periods of time with respect to the same furnace. Nor would such a large change ever occur with respect to certain furnaces under even drastically changing conditions. However, such a large change is hypothesized to better illustrate an important point about the effects of a change in the phase angle. In FIG. 1(b), the phase angle $\phi_2$ has now doubled to approximately 72°, yielding a power transfer value of approximately 0.31 (cos $\phi$=cos 72°=0.31). Thus, the change in resonant frequency will cause a reduction in the power transfer unless the phase angle is readjusted. In this instance, the phase angle should be reduced so that optimum power transfer efficiency is maintained. In a case where changes in the load causes the resonant frequency to decrease, the phase angle should be increased to avoid having it approach too close to zero.

The control circuitry in U.S. Pat. No. 5,165,049 functions to increase or decrease the phase angle as the resonant frequency of the load varies, thereby maintaining optimum power transfer efficiency. This control circuitry typically requires a few waveform cycles to complete the adjustment in phase angle because of the time delay inherent in its feedback mode of operation. For example, in a more realistic example, the resonant frequency of a furnace might vary from 1000 Hz to 1030 Hz due to addition of some metal charge. An adjustment delay of three or four cycles would only take 3–4 milliseconds. Also, since the phase angle need only be changed by a very slight amount, no significant problems are encountered in generally maintaining a relatively steady and optimum transfer of power at all times. Furthermore, any changes in the resonant frequency will likely occur gradually. For example, resonant frequency changes caused by adding or removing metal charge or by varying the temperature of the charge are likely to occur over the course of seconds or minutes, compared with the adjustment delay time or lag time of the phase angle adjusting circuitry. In sum, a single inverter/single load configuration will rarely ever encounter power transfer problems associated with changes in the resonant frequency of the load.

In U.S. Pat. No. 5,165,049, a single induction load (e.g., a single furnace) is supplied by a single inverter power supply. It is sometimes desired to connect a single inverter power supply to plural induction loads, for example, to two or more furnaces or zone heaters, thereby avoiding the expense that would be associated with powering each induction load with a separate power supply. However, a problem arises when a single inverter power supply is switched among plural induction loads. Since each induction load will most likely have significantly different resonant frequencies at any given point in time, the phase angle referred to above will have to be constantly adjusted by relatively large amounts (as compared to very small adjustment amounts when using a single induction load) each time the power supply is switched to a new load. Furthermore, the phase angle adjustment should occur almost instantaneously if the power supply is distributing the power by switching from one load to the next in a time multiplexed manner. For example, instead of FIGS. 1(a) and FIGS. 1(b) representing the varying resonant frequency of a single load at different periods of time, these figures might represent two different loads having significantly different resonant frequencies which are sequentially connected to a single inverter power supply in a time multiplexed manner.

If the phase angle adjusting circuitry in U.S. Pat. No. 5,165,049 were employed for switching a single inverter power supply between two different loads having significantly different resonant frequencies, the inherent time delay associated with its feedback manner of operation would result in a significant temporary overshoot or undershoot of power delivered to the load during every switching. Even though the phase angle will eventually be adjusted by the circuitry to optimize the power transfer for the new load, the time period for adjustment will span several waveform cycles and will be long enough to cause a significant temporary overshoot or undershoot of power. Although this overshoot and undershoot also occurs when a single load undergoes changes in its resonant frequency, the amount of overshoot and undershoot will typically be insignificant (and often so small as to be undetectable) because any phase angle changes caused by changes in the parameters of the metal charge will usually be very small and will occur over relatively long periods of time as compared to the lag time of the phase angle adjusting circuitry.

Large overshoots have the potential of damaging critical circuit components. Large overshoots and undershoots also distort the desired distribution of power among plural loads by introducing uncontrollable and unpredictable changes or fluctuations of power transfer efficiencies. Accordingly, there is a need in the art to reduce the amount of overshoot and undershoot caused by switching among plural loads sharing a single inverter power supply. There is also a need to provide such a function in conjunction with existing phase angle adjusting circuitry in U.S. Pat. No. 5,165,049. The present invention fills these needs.

SUMMARY OF THE INVENTION

The present invention defines a system for switching power from an output of a single inverter power supply to at least a selected one of plural inductive loads. Each load has a respective resonant frequency associated therewith. The inverter power supply has an inverter output switch therein and can output a preselected adjustable amount of power. The system includes a load switching means for selectably switching the inverter output among selected ones of the plural inductive loads in a time-shared manner, means for measuring power output from the inverter and detecting overshoot and undershoot power values occurring when switching from one inductive load to another, a time delay source for connection to the load switching means for starting a delay time period upon switching from one inductive load to another and for generating and outputting a signal at a preselected end of the delay time period, and means for adjusting the preselected end of the delay time period during a subsequent switching operation from one load to another in response to the measured power overshoot and undershoot by an amount calculated to reduce subsequent overshoot and undershoot. The signal output by the time delay source triggers the inverter output switch to deliver the power output of the inverter to the load switching means for switching to the selected load.

The present invention also defines a method for reducing the overshoot and undershoot power values occurring when switching from one inductive load to another.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIGS. 1(a) and 1(b) show load current waveforms for loads with different resonant frequencies.

FIG. 2(a) shows a graph of load current as a function of time at two inductive loads which receive power from a single inverter power supply.

FIG. 2(b) shows load power drawn from a single inverter power supply fired by a time delay generator having a fixed threshold control voltage level for the two inductive loads of FIG. 2(a).

FIG. 2(c) shows load power switch firing pulses for switching between loads 1 and 2 in FIG. 2(a).

FIG. 2(d) shows SCR inverter switch firing pulses for switching between loads 1 and 2 in FIG. 2(a).

FIG. 5(a) shows a graph of load current as a function of time at two inductive loads which receive power from a single inverter power supply.

FIG. 5(b) shows load power drawn from a single inverter power supply fired by a time delay generator having an adjustable threshold control voltage level for the two inductive loads of FIG. 5(a).

FIG. 5(c) shows load power switch firing pulses for switching between loads 1 and 2 in FIG. 5(a).

FIG. 5(d) shows SCR inverter switch firing pulses for switching between loads 1 and 2 in FIG. 5(a).

DESCRIPTION OF THE INVENTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Figure 4:
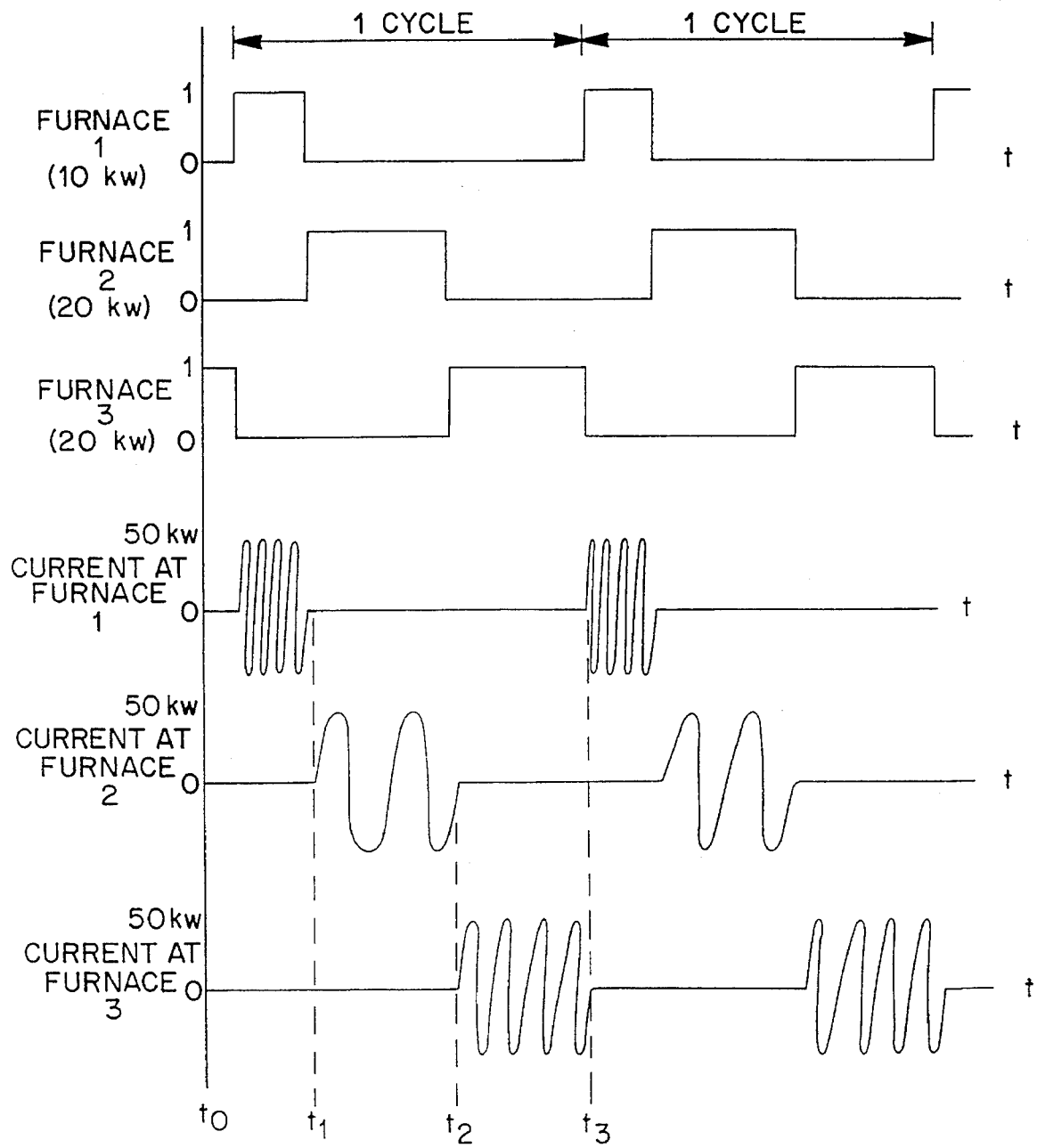
FIG. 4 shows a pulse width modulation scheme for distributing power from a single inverter source to plural loads.
Figure 6:
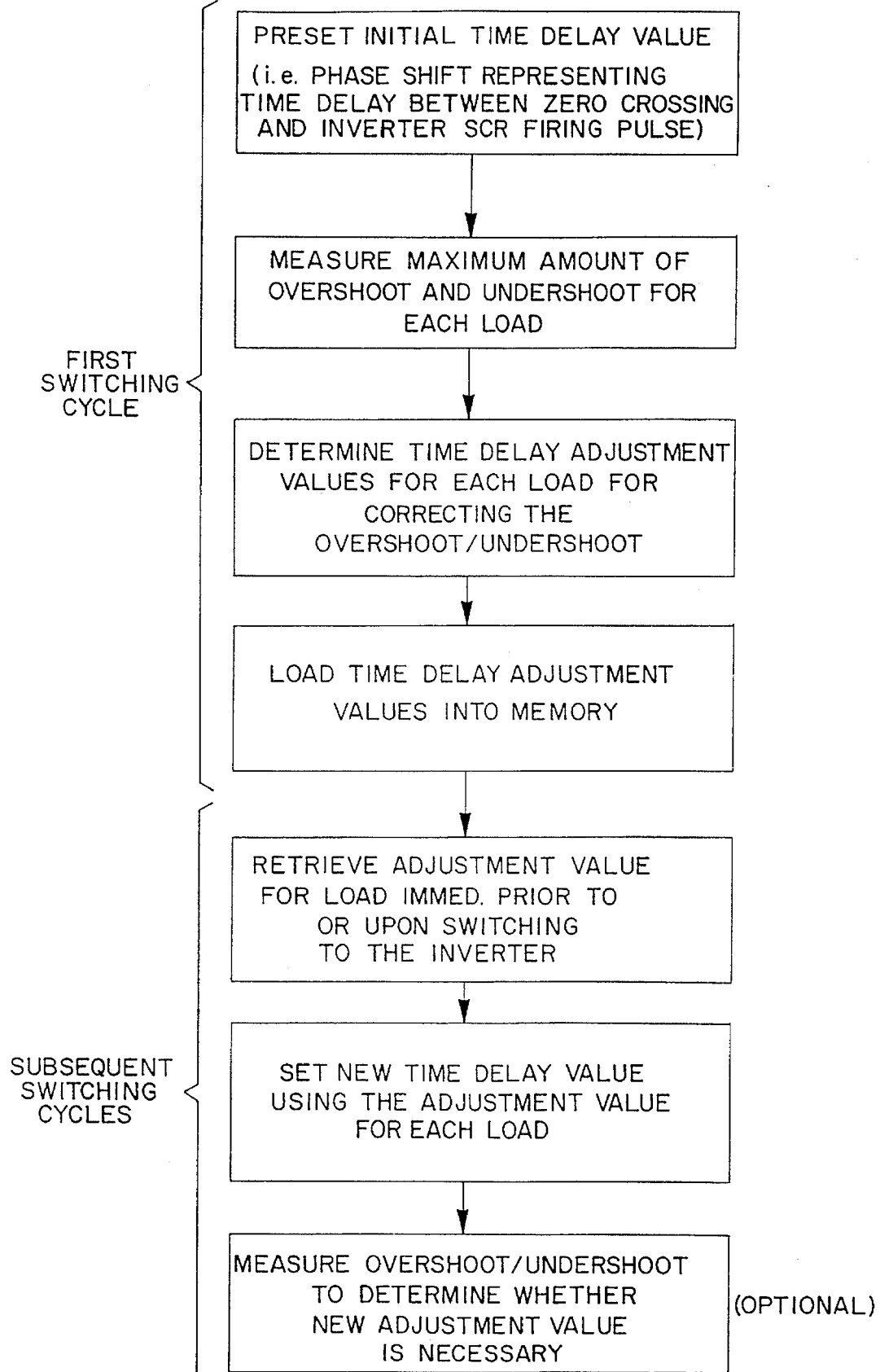
FIG. 6 shows a functional flowchart of the steps of the phase angle adjusting feature of the invention.

FIGS. 4 and 6 of U.S. Pat. No. 5,165,049 show a control system having a delay generator which outputs a signal for triggering SCR firing pulses. The amount of delay is proportional to the phase angle. In the particular embodiment described in U.S. Pat. No. 5,165,049, the amount of delay is a function of the time that it takes timing capacitors to charge to a preset threshold amount (i.e., threshold control voltage). The quicker the timing capacitors are charged, the smaller the amount of delay because the timing capacitors will reach the preset threshold amount sooner. In the control system of U.S. Pat. No. 5,165,049, the threshold amount is preset externally. The capacitors must always reach the preset threshold amount before the delay generator outputs the signal for triggering SCR firing pulses. As noted earlier, if a second inductive load having a significantly different resonant frequency is connected to the inverter power supply, the phase angle must be precisely and rapidly adjusted for each successive switching of loads in order to prevent overshoot or undershoot. (It should be recognized that the use of timing capacitors in U.S. Pat. No. 5,165,049 is only one way to create a delay period. The delay period can also be created by generating delay pulses and triggering the SCR firing pulse upon the detection of a preselected number of delay pulses.)

In one embodiment of the invention, the phase angle is adjusted by changing the threshold amount or threshold control voltage of a time delay generator such as one described in U.S. Pat. No. 5,165,049. By adjusting the threshold control voltage, the time delay can be either lengthened or shortened in accordance with the amount of expected overshoot or undershoot. For example, if switching from furnace 1 to furnace 2 would cause undershoot due to their different resonant frequencies, the threshold control voltage would be decreased, thereby decreasing the delay in firing of the SCRs and in turn decreasing the phase angle of furnace 2 with respect to furnace 1. The decreased phase angle will increase the power going to furnace 2 (the smaller the delay time, the smaller the phase angle $\phi$ and, therefore the greater is VI cos $\phi$ in Equation 1 above), thereby reducing the amount of undershoot. Most importantly, the increase in power will be more immediate than would occur if the threshold control voltage was not adjustable, as in U.S. Pat. No. 5,165,049. The phase angle adjustment scheme of that patent while perfectly fine for a single induction load, causes overshoot and undershoot when such a scheme is applied to a single power source/multiple induction load environment. The addition of a threshold adjusting feature according to the present invention overcomes such a limitation.

FIG. 2(a) shows a graph of load current as a function of time at two inductive loads which receives power from a single inverter power supply. The inductive loads have different resonant frequencies. In this exaggerated example, load 2 has a resonant frequency double that of load 1. Each load in this example receive equal amounts of power. Thus, the inverter power supply switches between loads 1 and 2 at equal intervals of time (i.e., time $t_1$ to time $t_2$=time $t_2$ to time $t_3$, etc. ... ). The switching points are at times $t_1$, $t_2$, $t_3$, and so on. Time $t_0$ is not a switching point but rather, is a point in time during the power cycle of load 1.

FIG. 2(b) shows a time graph of load power drawn from a single inverter power supply and received sequentially by the two inductive loads of FIG. 2(a). The inverter power supply in FIG. 2(b) is fired by signals from a time delay generator such as shown in FIG. 4 of U.S. Pat. No. 5,165,049. When employing only the phase angle adjusting circuitry disclosed in U.S. Pat. No. 5,165,049 (see especially FIG. 4 of the patent), the circuitry will continually adjust the phase angle $\phi$ to maintain optimum power transfer. In this example, the phase angle will change back and forth from $\phi_1$ (the phase angle when load 1 is switched to the power supply) to $\phi_2$ (the phase angle when load 2 is switched to the power supply). This switching back and forth between the loads causes temporary power overshoots and undershoots. From time $t_0$ to $t_1$, power is steadily applied to load 1 because the phase angle adjusting circuitry has already acted to set the optimum phase angle $\phi_1$ and because no significant changes are occurring in the resonant frequency of load 1. At time $t_1$, power is switched from load 1 to load 2. Since load 2 has a different resonant frequency from load 1, load 2 will require a different phase angle $\phi$ (in this case, a smaller phase angle $\phi_2$) for the reasons discussed above. However, since a plurality of cycles will occur before the phase angle adjusting circuitry makes its adjustment from $\phi_1$ to $\phi_2$, an undesired temporary power undershoot occurs. Eventually, the phase angle adjusting circuitry reduces the phase angle to $\phi_2$ to account for the higher resonant frequency and the power returns to steady state. At time $t_2$, switching from load 2 back to load 1 causes an undesired temporary overshoot at load 1 because the phase angle $\phi$ has not yet readjusted to a value appropriate for load 1 (i.e., readjusted from $\phi_2$ to $\phi_1$). Again, the phase angle adjusting circuitry will eventually increase the phase angle $\phi$ to account for the lower resonant frequency. At time $t_3$, the same power undershoot effect occurs as at time $t_1$, and so on.

In sum, the phase angle $\phi$ set by the circuitry in U.S. Pat. No. 5,165,049 at a load switching point will never be optimum when the loads being switched have significantly different resonant frequencies.

FIGS. 2(c) and 2(d) show, respectively, a graph of load power switches and SCR inverter firing pulse switches as a function of time for switching between loads 1 and 2 in FIG. 2(a). Since load switches may also employ SCRs, load power can be switched by firing pulses which turn on and off respective load switch SCRs. FIG. 2(c) shows firing pulses for turning on a respective load switch SCR. (Simultaneous firing pulses turn off the other load.) The switch SCR firing pulses should occur as soon as inverter current crosses zero (i.e., at times $t_1$, $t_2$, $t_3$, and so on). Taking into account all delays in electronics and SCR turn-on time, it is necessary to fire the switch SCRs slightly before the current zero crossing. However, FIG. 2(c) shows an idealized situation wherein no such delays are encountered.

Once the zero crossing has been detected, a short time interval passes until the inverter SCRs are fired, thereby delivering the inverter output power to the load switches which direct the power to the appropriate load. This time interval or time delay period is adjusted by feedback control by the phase angle adjusting circuitry disclosed in U.S. Pat. No. 5,165,049 to obtain a given phase angle φ appropriate for the load connected to the inverter power supply. Thus, the time delay period determines the phase angle φ.

FIG. 2(c) shows a firing pulse at current zero crossings associated with switching points between loads 1 and 2. FIG. 2(d) shows inverter SCR firing pulses at time intervals $t_x$ and $t_y$ following the zero crossing points. Thus, an inverter firing pulse occurs at times $t_1+t_x$, $t_2+t_y$, $t_3+t_x$, and so on. As should be evident from FIGS. 2(a) to 2(d), the length of the time intervals are proportional to the phase angle φ. Although FIG. 2(d) shows only inverter firing pulses subsequent to a switch between loads, it should be understood that an inverter firing pulse occurs at that time interval following every zero crossing. It should also be evident that since $φ_1$ is greater than $φ_2$, time interval $t_x$ must be greater than $t_y$.

Although FIGS. 2(a) to 2(d) show an example wherein a single inverter power supply switches between two loads, it should be understood that the inverter power supply may switch among more than two loads. Thus, there may be more than two phase angles and associated time delay periods. Correspondingly, the load power graph in FIG. 2(b) would then show different amounts of overshoot and undershoot for each switching between successive loads.

Figure 3:
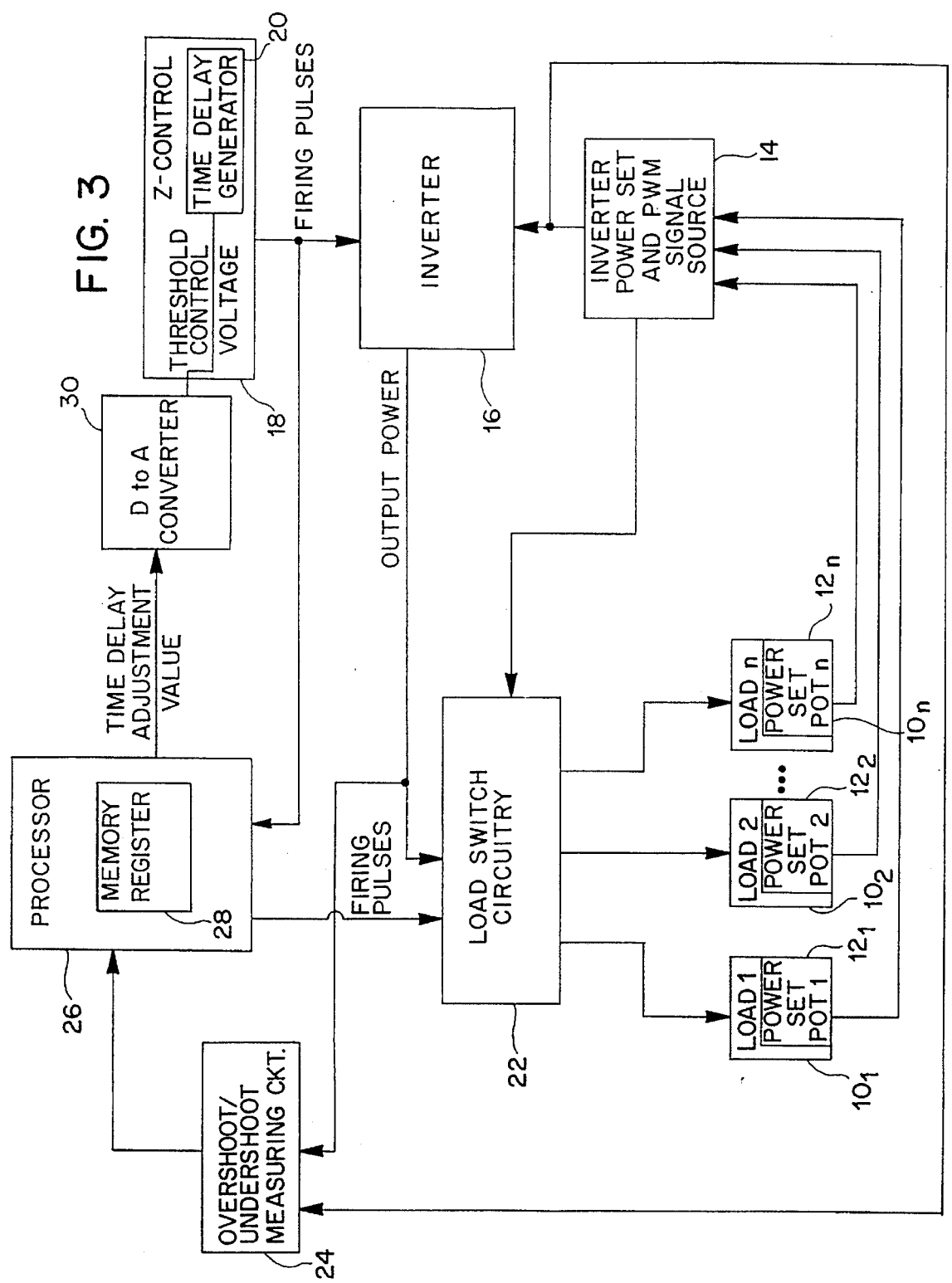
FIG. 3 shows a block diagram of the invention.
Figure 3A:
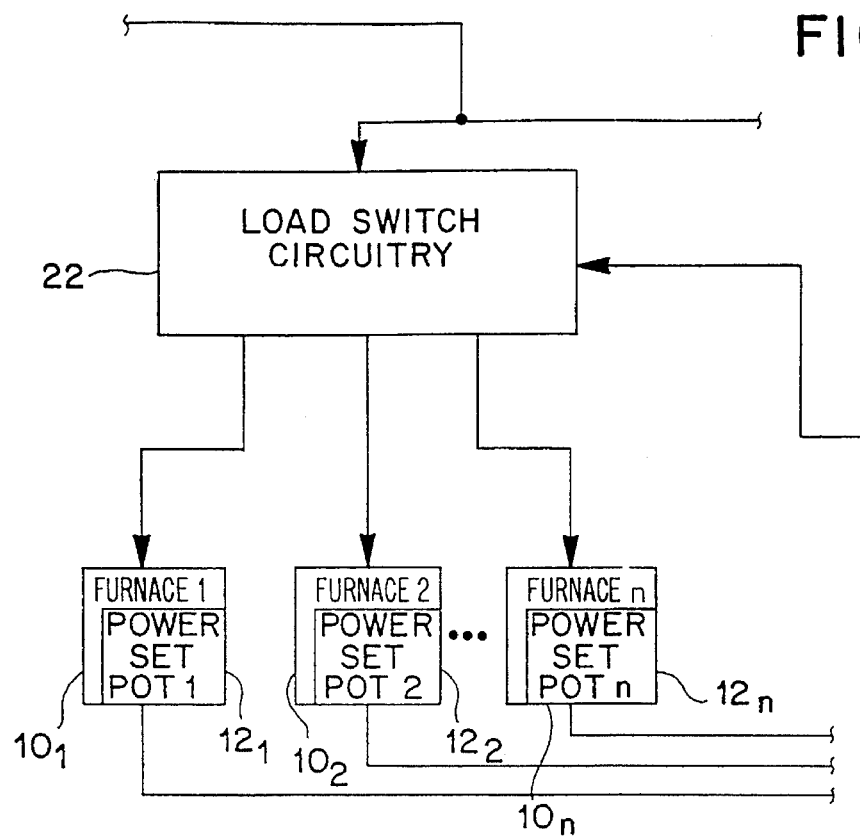
FIGS. 3(a) and 3(b) illustrate alternate embodiments of the invention, in which the generalized inductive loads of FIG. 3 comprise induction furnaces and plural zones of a single inductive load, respectively.
Figure 3B:
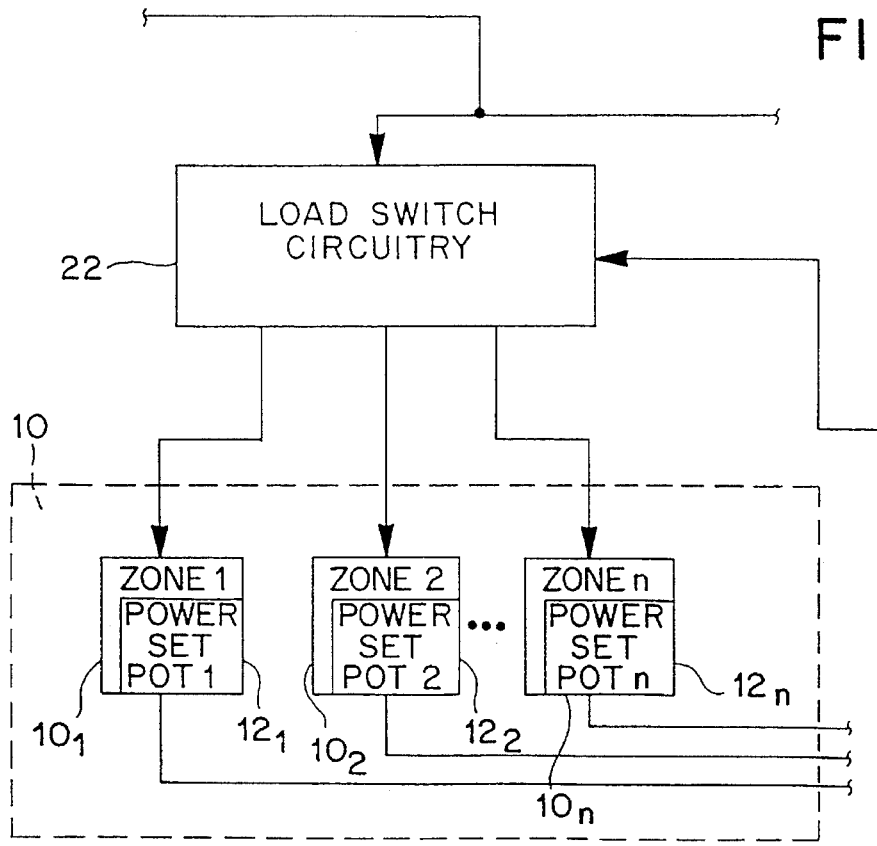

FIG. 3 shows a block diagram of circuitry for reducing overshoots and undershoots illustrated in FIG. 2(b). The block diagram shows inductive loads $10_1$, $10_2$, ... $10_n$ which correspond to loads 1, 2, ... and n, respectively. Inductive loads $10_1$, $10_2$, ... $10_n$ are shown generally in FIG. 3, but it should be understood that the inductive loads may comprise individual inductive furnaces $10_1$, $10_2$, ... $10_n$, as shown in FIG. 3(a), of may comprise plural zones $10_1$, $10_2$, ... $10_n$ of a single inductive load 10, as shown in FIG. 3(b). It is well-known in the art of inductive heating that a single inductive load such as an induction coil may be divided into separately controllable zones (see, for example, U.S. Pat. No. 4,506,131), and accordingly it is believed that a detailed description of how this is accomplished is unnecessary. Each inductive load has a power set potentiometer $12_1$, $12_2$, ... $12_n$ associated therewith. In operation, each power set potentiometer $12_1$, $12_2$, ... $12_n$ is set at a desired power level. The power levels are sent to inverter power set 14 which converts the analog potentiometer values to digital values and adds up the total power. The power set 14 scales the power if necessary (e. g., if the total power set by the potentiometers exceeds the maximum capacity of the inverter power supply) and outputs a signal to set inverter power supply 16 to the appropriate level. The power set 14 also employs the potentiometer values to facilitate the timing periods associated with a pulse width modulation (PWM) switching scheme, described below with respect to FIG. 4.

It is also well-known in the art of inductive heating that multiple inductive loads, or single inductive loads divided into separately controllable zones, powered by a single inverter supply require switching devices to deliver power from the source to the multiple loads or zones (see for example U.S. Pat. No. 5,272,719). Accordingly, it is believed that a detailed description of how this is accomplished is unnecessary.

Inverter 16 may be any inverter source. One suitable type inverter is shown in FIG. 2 of U.S. Pat. No. 5,165,049. Inverter 16 outputs power whenever it receives a firing pulse from a pulse generating source. One such source is the circuit shown in block diagram form in FIG. 4 of U.S. Pat. No. 5,165,049 and referred to therein as a "z-control." As described therein, the delay generator in the z-control circuit outputs a firing pulse when its timing capacitors reach a fixed threshold amount or threshold control voltage. Although the z-control is capable of adjusting the phase angle by varying the charging rate of timing capacitors, and thereby the time in which the capacitors take to reach the fixed threshold amount, the threshold amount or threshold control voltage of the time delay generator remains fixed.

FIG. 3 of the invention shows z-control circuit 18 having time delay generator 20 associated therewith. The time delay generator in one embodiment is similar to the z-control circuit in U.S. Pat. No. 5,165,049 having delay generator 122, except for the ability in the invention's circuit to adjust the threshold control voltage.

Returning again to the operation of the circuit of FIG. 3, inverter 16 delivers its output power to load switch circuitry 22 which routes the output power to the appropriate load 1, 2, or n, in accordance with the PWM scheme. The inverter output power is also fed to overshoot/undershoot measuring circuit 24 which monitors the output power level and determines the overshoot and undershoot power values occurring at the switching points during a first switching cycle and informs processor 26 of the values. The overshoot and undershoot power value represents an amount of power being drawn from the load which is greater or less than the amount of power set by power set 14. Thus, the presence of a significant overshoot or undershoot indicates that the phase angle φ for a given load is temporarily not at its ideal, desired value. The processor 26 determines from the overshoot and undershoot values how much the phase angle φ should be adjusted to obtain the ideal, desired value for that load and converts this information into a time delay value. The time delay value is then stored in a register of memory 28 associated with the processor 26.

During the next switching cycle, the processor 26 retrieves from the appropriate register of memory 28 the time delay value and outputs the value to D to A converter 30. The D to A converter 30 converts the digital value to an analog value (a threshold control voltage level) and provides that level to the time delay generator 20. Thus, in the embodiment of FIG. 3, the time delay value represents the threshold control voltage of the time delay generator 20 in the z-control circuit 18. The time delay generator 20 responds to this analog signal by adjusting the amount of delay between the switching point (always at a current zero crossing) and the firing of the inverter SCRs. (The firing of the inverter SCRs causes power to flow from the inverter power supply to the load, as explained in U.S. Pat. No. 5,165,049.)

The firing pulses output by time delay generator 20 are sent directly to the inverter 16 and to load switch circuitry 22 via processor 26. The firing pulses are used by the time delay generator 20 to start the time delay period (by looking up the appropriate time delay value as just described) upon switching from one inductive load to another. The firing pulses are then sent on to load switch circuitry 22.

In one embodiment of the invention, the threshold control voltage is adjusted in accordance with the formula, $$V_{new} = \frac{V_{old}}{2} \left( 1 + \frac{P_2}{P_1} \right) \qquad \text{(Equation 2)}$$

where:

$V_{old}$ is the original control voltage;

$V_{new}$ is the control voltage for the successive inductive load;

$P_1$ is the set power amount; and $P_2$ is the power amount of overshoot or undershoot $P_2$ is determined in measuring circuit 24 by sampling a power response curve such as shown in FIG. 2(*b*). It should be noted that Equation 2 is only one example of a formula that can be employed for determining values for adjusting the threshold control voltage.

The calculation of Equation 2 is performed during the first cycle of switching among successive loads, thereby yielding a series of threshold control voltages which are stored in memory 28, one for each load. During subsequent cycles of switching, Equation 2 is performed only when needed, i.e., only when the overshoot or undershoot is significantly large enough to warrant recalculation of $V_{new}$, such as would occur if the resonant frequency of one particular load changed significantly. In practice, the threshold control voltage for the transition from load n to load 1 is not calculated. This threshold control voltage is set somewhere in the middle of the range of threshold control voltages and always remains fixed. Typical time delay generator integrated circuits such as shown in FIG. 4 of U.S. Pat. No. 5,165,049 have threshold control voltage ranges from about 5 V to about 15 V. Thus, the threshold control voltage may be fixed at about 8 V and replaced by new values for switchings from loads 1 to 2, 2 to 3, . . . , and from n back to 1. Accordingly, there will be n-1 different threshold control voltage values when switching among n loads.

As described above, processor 26 includes a memory 28 with registers 1 through n-1 for storing the $V_{new}$ control voltage values from Equation 2. For example, register 1 might store a value of 10 indicating that the control voltage is to be adjusted or changed to 10 V upon switching from load 1 to load 2. Register 2 might store a value of 7 V indicating that the control voltage is to be changed to 7 V upon switching from load 2 to load 3, and so on. Again, whenever the load is switched from load n back to load 1, the original control voltage is always restored.

It should be noted that no adjustment is made to the control voltage during the first switching cycle, even if significant overshoots and undershoots occur. Instead, these overshoots and undershoot are allowed to occur and are measured and used to calculate appropriate adjustments to the control voltage to prevent future occurrences of overshoots and undershoots.

During the first switching cycle, (i.e., when the system is first turned on) output power from the inverter power supply is scaled down to 30% or less of full power regardless of the settings of the power set potentiometers. This initial scaling down is necessary in order to prevent the occurrence of an overshoot of an amplitude that may damage critical circuit components. Although the circuitry of the invention reduces subsequent overshoots, certain components could fail if subjected to excessive overshoot at maximum inverter output. By significantly scaling down the power, the absolute overshoot will be within safe limits and even a relatively large percentage of overshoot will not subject circuit components to excessive power levels. Since the amount of overshoot and undershoot caused by switching from one load to the next is proportional to the inverter output (i.e., a 50% power overshoot at maximum inverter power will also appear as a 50% power overshoot at 30% inverter power), the overshoot/undershoot measuring circuit 24 scales its output accordingly so that the calculations performed by processor 26 for determining the appropriate time delay will not be affected by the absolute power settings.

In the environment of the invention, power from a single inverter power supply is shared among plural loads (e.g., plural induction furnaces) by a pulse width modulation (PWM) scheme. The power supply is amplitude modulated, for example, by potentiometers at each load, to provide the desired power output level for the respective load. The power is individually set for each load by a respective power set potentiometer $12_1$, $12_2$, . . . or $12_n$. Then, signals from each individual power set potentiometer are added together by a microcontroller to obtain the power set signal of the inverter power supply. Thus, the power output level of the inverter power supply is not set or adjusted at the power supply. Instead, it is set and adjusted by varying one or more of the power set potentiometers associated with the loads. The power set potentiometers $12_1$, $12_2$, . . . $12_n$ associated with each load are all identical and can be set within a range of voltages representing values from 0% power to 100% power.

For example, if the power is set to 30% for load 1 and 40% for load 2, the inverter will supply 70% (30+40=70) of its full power amount. If the percentage of power exceeds 100%, the power levels are proportionally scaled down for each respective load. For example, if load 1 is set to 70% and load 2 is set to 60%, the real power will be scaled down to 54% (70/(70+60) =54) and 46% (60/(70+60)=46), respectively.

Once the total power to be output by the inverter is set, the PWM scheme distributes the power among the loads in time intervals proportional to the potentiometer settings. In the first example above, load 1 would be powered for 3/7 of the time and load 2 would be powered for 4/7 of the time. Thus, if the time cycle is 10 seconds, load 1 would be ON for approximately 4.3 seconds and OFF for approximately 5.7 seconds of each time cycle. Likewise, load 2 would be ON for approximately 5.7 seconds and OFF for approximately 4.3 seconds of each time cycle. In the second example, load 1 would be powered for 54% of the time and load 2 would be powered for 46% of the time.

FIG. 4 shows waveforms and gating pulses associated with the PWM scheme wherein a single inverter power supply switches between three furnaces. In this manner, power from a single inverter power supply is shared among plural loads (e.g., plural induction furnaces) by switching among the furnaces at preset time periods. In the illustrative example, furnace 1 requires 10 kW of power, furnace 2 requires 20 kW of power, and furnace 3 requires 20 kW of power. Thus, the inverter power supply is set to provide 50 kW. In this example, no scaling down is required because the inverter power supply has not exceeded its maximum capacity.

The example in FIG. 4 performs its PWM as follows: a gate enabling signal for furnace 1 is turned on for 1/5 of a cycle and is turned off for 4/5 of a cycle. A gate enabling signal for furnace 2 is turned on for 2/5 of a cycle and is turned off for 3/5 of a cycle. Lastly, a gate enabling signal for furnace 3 is turned on for 2/5 of a cycle and is turned off for 3/5 of a cycle. No two gate enabling signals are turned on at the same time. In this manner, the inverter power supply is switched to the appropriate furnace at pulsed intervals of time calculated to divide up the 50 kW among the three furnaces in the amounts desired by the power set potentiometers. For example, at time $t_1$, power is switched from furnace 1 to furnace 2. At time $t_2$, power is switched from furnace 2 to furnace 3. At time $t_3$, power is switched from furnace 3 to furnace 1, and so on. The switching occurs at a zero crossing of the inverter current (i.e., when inverter current is zero). A zero crossing detector signals when the inverter current is zero and switching can occur.

FIG. 4 depicts furnaces with different resonant frequencies. As discussed above, the resonant frequency of a furnace will vary with many factors, such as the composition, temperature and amount of metal charge therein.

FIG. 5(a) shows a graph of load current as a function of time for the same loads as in FIG. 2(a) and illustrates the manner in which the invention addresses the cause of power overshoots and undershoots (i.e, the inability to quickly set the phase angle φ at a load switching point to an optimum value when the loads being switched have significantly different resonant frequencies). The invention can reduce the overshoots and undershoots to virtually unnoticeable levels, similar to what is shown in FIG. 5(b).

FIGS. 5(c) and 5(d) show, respectively, a graph of load power switches and SCR inverter firing pulse switches as a function of time for switching between loads 1 and 2 in FIG. 5(a). The load power switches (switch SCRs) fire in the same manner as shown in FIG. 2(a). However, the inverter SCRs are fired at time intervals appropriate for the resonant frequency of the particular load. Thus, as shown in FIG. 5(d), inverter SCR firing pulses occur at times $t_1+t_y$, $t_2+t_y$, $t_3+t_y$, and so on. No phase angle adjustment period is required in the invention. The phase angle φ is immediately set to the appropriate value upon switching, as determined by processor 26 in FIG. 3.

As described above, the appropriate value is determined by allowing overshoot or undershoot to occur during a first switching wherein the inverter output power is scaled down to 30% or less of its maximum power, measuring the maximum amount of overshoot and undershoot, and determining the appropriate time delay (i.e., phase angle) necessary to prevent the overshoot or undershoot during subsequent switching cycles. The adjustment value is stored (one adjustment value for each load) and then retrieved when needed. Thus, if the load current waveform in FIG. 5(a) was extended backwards to show the very first switching cycle, an undershoot similar to that shown in FIG. 2(a) would be present in the load power graph of FIG. 5(b) at the first switching point.

The load switching described above should occur only when inverter current changes direction. At this time, the energy accumulated in all inductors is equal to zero and there will be no voltage spikes related to the abrupt current interruption. The inverter switching also has to be synchronized with the zero crossing pulses and can be permitted only during time periods between inverter firing pulses and the zero crossings of inverter current.

It should be understood that when the invention is employed in conjunction with the phase angle adjusting circuitry disclosed in U.S. Pat. No. 5,165,049, this circuitry still functions while power is being applied to a load to make phase angle adjustments caused by minor drifts in the resonant frequency of the particular load due to changes in crucible parameters (e.g., composition, temperature, amount).

FIG. 6 shows a functional flowchart of the steps of the invention after the inverter output power and time intervals associated with the PWM scheme have been set.

Figure 7:
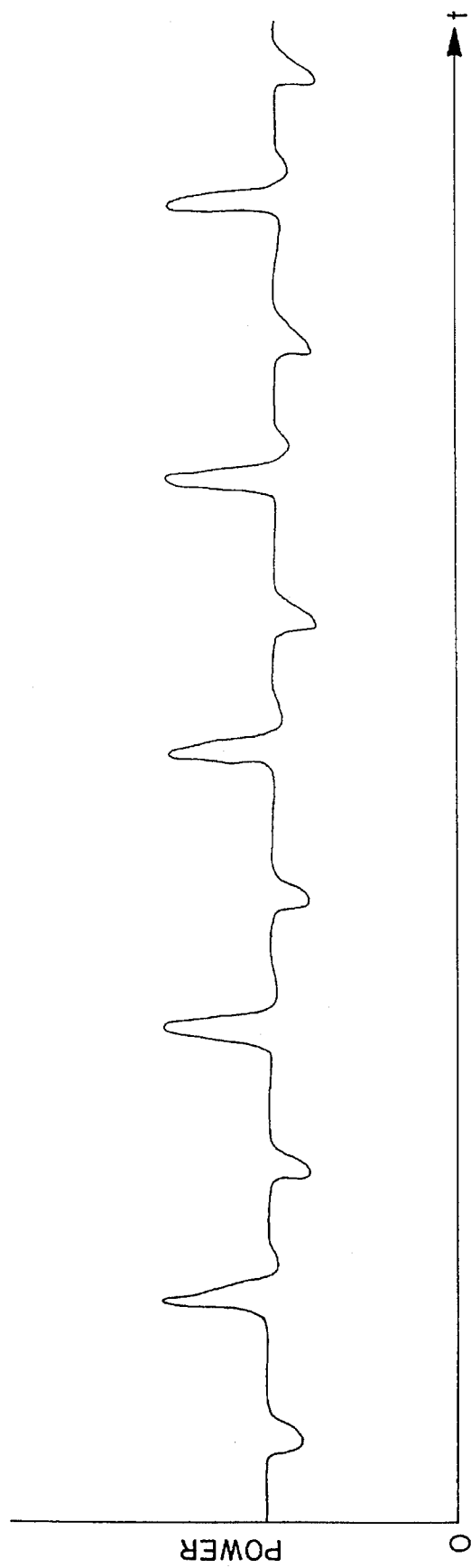
FIG. 7 shows power waveforms when employing the switching circuitry of the invention but without the phase angle adjusting feature of the invention.
Figure 8:
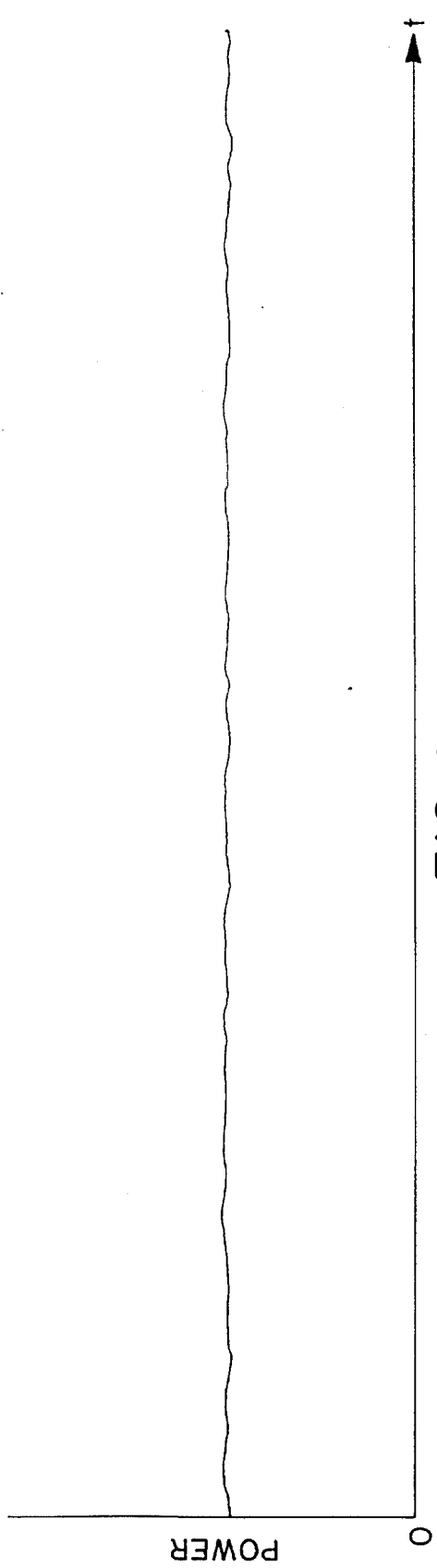
FIG. 8 shows power waveforms when employing the switching circuitry of the invention and the phase angle adjusting feature of the invention.

FIGS. 7 and 8 show how the addition of phase adjusting circuitry responsive to overshoot/undershoot values affects power.

FIG. 7 shows power as a function of time as a single inverter power source fired by a time delay generator with a fixed control voltage is switched between two inductive loads in the form of furnace 1 and furnace 2. A difference in the resonant frequencies of furnace 1 with respect to furnace 2 causes significant overshoot and undershoot near the switching points. The undershoot and overshoot are clearly visible.

FIG. 8 shows power as a function of time as the same single inverter power source of FIG. 7 is switched between the same two inductive loads of FIG. 7 during the same time period. However, in FIG. 8, circuitry employing the inventive phase adjusting circuitry responsive to overshoot/undershoot values has been added to the system. In this particular embodiment, the phase adjusting has been carried out by allowing for adjustments of the control voltage of time delay generator 28. As illustrated in FIG. 8, the overshoots and undershoots present in FIG. 7 are virtually eliminated by such circuitry.

The invention has been described above with respect to phase adjustment circuitry employing a time delay generator 28 wherein the time delay is adjusted by adjusting its control voltage. The scope of the invention, however, is by no means limited to such an analog manner of implementation. The above described embodiment of the invention could be considered "analog" in the sense that a variable control voltage determines the threshold voltage level of charging capacitors, thereby adjusting the time delay. To the contrary, the scope of the invention is meant to cover digital microprocessor implemented versions of the phase adjustment feature. As an artisan will recognize, the analog implementation described above can be easily replaced by digital microprocessor-controlled circuitry which would be programmed to fire the inverter SCRs at programmed intervals of time subsequent to a zero crossing associated with a load switching point. Thus, the time delay generator 20 would be replaced by a microprocessor programmed to digitally provide varying time delay periods.

Microprocessors are ideally suited to such timing-oriented tasks. In such an embodiment, it will be necessary to at least roughly predetermine the necessary time adjustment to the time interval between a zero crossing and SCR firing to correct a given amount of overshoot or undershoot. In effect, this predetermining step is equivalent to correlating the effect of the control voltage in Equation 2 above with the actual time delay interval. Once such values are known, the microprocessor can be programmed to (a) receive measured values of overshoot and undershoot during a first cycle of switching; (b) determine the appropriate time delay interval; and (c) provide such an interval during subsequent cycles of switching. One advantage of a microprocessor-based implementation of the phase shift adjustment feature is that the high operating frequency of the microprocessor in respect to the frequency of the inverter and the resonant frequency of the loads allows the microprocessor to continually perform steps (a) to (c) above and thereby make minor phase shift adjustments during every cycle. Thus, the microprocessor can continually monitor the load power for overshoot and undershoot and continually make the appropriate adjustments to the time delay interval.

The microprocessor-based embodiment may be similar to the specific embodiment described above in that the time delay interval may be fixed for load 1 and changed to a different value using calculated and stored values for loads 2, 3, . . . n. Thus, the microprocessor may store actual time delay intervals for each load, and upon switching of the load to receive the inverter output power, the time delay interval may be replaced with the new interval associated with the respective load.

When employing either the control voltage adjusting embodiment or the microprocessor-based embodiment, it is important that the time delay information be loaded into the time delay generator only during periods of time defined by the time period subsequent to a firing of an inverter SCR and before the next current zero crossing. The loading must not occur during periods of time defined by the time period after a zero crossing and before a firing of an inverter SCR because this time period is controlled by the previously loaded time delay period and must not be erased or altered until the firing of the inverter SCR.

It should also be recognized that the entire z-control circuit 18 is not a necessary feature of the invention. It is only necessary to provide the time delay generation function of that circuit. Thus, in a microprocessor-implemented embodiment, features of the z-control circuit 18 other than generation of a time delay for delaying firing of the inverter SCRs may be omitted or provided by the microprocessor itself.

The novel control apparatus and method described above provides significant advantages not contemplated by the prior art. Specifically, the apparatus and method allows a single inverter power source to supply plural inductive loads in a pulse width modulation manner while minimizing load power overshoots and undershoots that would otherwise result from rapid switching among successive loads.

The present invention may be embodied in other specific forms without departing from the spirit or essential attributes thereof and, accordingly, reference should be made to the appended claims, rather than to the foregoing specification, as indicating the scope of the invention.

We claim:

1. A control system for controlling overshoot and undershoot power values when switching power from an output of a single inverter power supply to at least a selected one of plural inductive loads, each inductive load having a respective resonant frequency associated therewith, the inverter power supply having an inverter output switch therein and being adjustable for outputting a preselected amount of power, the system comprising:

(a) load switching means for selectably switching the inverter output among selected ones of the plural inductive loads in a time-shared manner;

(b) means for measuring power output from the inverter and detecting overshoot or undershoot power values occurring when switching from one inductive load to another;

(c) time delay source for connection to the load switching means for starting a delay time period upon switching from one inductive load to another and for generating and outputting a signal at a preselected end of said delay time period, the signal triggering the inverter output switch to deliver the power output of the inverter to the load switching means for switching to the selected load; and (d) means for adjusting the preselected end of the delay time period during a subsequent switching operation from one load to another in response to the measured overshoot or undershoot power values by an amount calculated to reduce subsequent power overshoot or undershoot.

2. A control system according to claim 1, further comprising (e) means for storing separate delay time period ending values based on the power overshoot or undershoot associated with switching between successive inductive loads, the delay time periods being separately provided in response to the separately stored values upon switching to each successive inductive load.

3. A control system according to claim 2 wherein the time delay source includes a control voltage level, the time delay source generating and outputting the triggering signal upon attaining the control voltage level, the time period values representing the control voltage level, the control voltage level having an original control voltage level and a level associated with each inductive load.

4. A control system according to claim 3, wherein the control voltage level is determined in accordance with the formula $$V_{new} = \frac{V_{old}}{2}\left(1 + \frac{P_2}{P_1}\right)$$

where:

$V_{old}$ is the original control voltage;

$V_{new}$ is the control voltage for the successive inductive load;

$P_1$ is the set power amount of the inverter source; and $P_2$ is the power amount of overshoot or undershoot.

5. A control system according to claim 4, wherein the equation in the formula is performed during the first cycle of switching to successive loads and is subsequently performed only when the means for measuring power output detects overshoot or undershoot power values outside preselected limits.

6. A control system according to claim 5 further comprising (g) a memory for storing values representative of a control voltage, the values being updated in the memory whenever a new control voltage level is determined.

7. A control system according to claim 4 further comprising (g) a memory for storing values representative of a control voltage, the values being updated in the memory whenever a new control voltage level is determined.

8. A control system according to claim 3 wherein the control voltage for one of said loads is fixed at the preselected fixed value, the control voltage level varying for the other of said loads in accordance with the level associated with each of the inductive loads.

9. A control system according to claim 2, wherein the delay time period for one of said loads is fixed, the time periods being adjusted from the fixed time period for the other of said loads.

10. A control system according to claim 1, wherein the plural inductive loads include either plural inductive furnaces or plural zones of a single inductive load.

11. A control system according to claim 1, further comprising (e) means for detecting zero crossings of current in the inverter connected to the inductive load switching means, wherein the inductive load switching means switches at zero crossings of current in the inverter.

12. A control system for controlling overshoot and undershoot power values when switching power in a pulse width modulation manner from an output of a single inverter source to plural inductive loads, each inductive load having a respective resonant frequency, the inverter source set for outputting a set amount of power, the system comprising:

(a) inductive load switching means for switching to successive inductive loads, the inverter output being connected to the switching means for directing the inverter output to the successive inductive loads;

(b) an inverter output switch associated with the inverter source;

(c) means for measuring a maximum amount of overshoot and/or undershoot of power which occurs when switching to a successive inductive load, the overshoot and/or undershoot representing drawing by the load of an amount of power greater or less than the amount of power set for outputting by the inverter;

(d) time delay source for connection to the inductive load switching means for starting a time period upon detection of the switching to a successive load and for generating and outputting a signal at the end of a preselected time period, the signal triggering the inverter output switch to deliver the inverter's power to the successive load; and (e) means for adjusting the preselected time period in response to the maximum measured amount of overshoot and/or undershoot, the adjustment occurring during a subsequent switching to the successive loads, thereby reducing subsequent amounts of overshoot and/or undershoot.

13. A control system according to claim 12, further comprising (f) means for storing separate time period values based on the maximum amount of overshoot and/or undershoot associated with each inductive load, the time periods being separately provided by employing the separately stored values upon switching to each successive inductive load.

14. A control system according to claim 13 wherein the time delay source includes a control voltage level, the time delay source generating and outputting the triggering signal upon attaining the control voltage level, the time period values representing the control voltage level, the control voltage level having an original control voltage level and a level associated with each inductive load.

15. A control system according to claim 14, wherein the control voltage level is determined in accordance with the formula $$V_{new} = \frac{V_{old}}{2}\left(1 + \frac{P_2}{P_1}\right)$$

where:

$V_{old}$ is the original control voltage;

$V_{new}$ is the control voltage for the successive inductive load;

$P_1$ is the set power amount of the inverter source; and $P_2$ is the power amount of overshoot or undershoot.

16. A control system according to claim 15, wherein the equation in the formula is performed during the first cycle of switching to successive loads and is subsequently performed only when the means for measuring overshoot and/or undershoot detects overshoot and/or undershoot outside preselected limits.

17. A control system according to claim 16 further comprising (g) a memory for storing values representative of a control voltage, the values being updated in the memory whenever a new control voltage level is determined.

18. A control system according to claim 15 further comprising (g) a memory for storing values representative of a control voltage, the values being updated in the memory whenever a new control voltage level is determined.

19. A control system according to claim 14 wherein the control voltage for one of said loads is fixed at the preselected fixed value, the control voltage level varying for the other of said loads in accordance with the level associated with each of the inductive loads.

20. A control system according to claim 13, wherein the preselected time period for one of said loads is a fixed time period, the time periods being adjusted from the fixed time period for the other of said loads.

21. A control system according to claim 12, wherein the plural inductive loads include either plural inductive furnaces or plural zones of a single inductive load.

22. A control system according to claim 12, further comprising (f) means for detecting zero crossings of current in the inverter connected to the inductive load switching means, wherein the inductive load switching means switches at zero crossings of current in the inverter.

23. A method for controlling the power overshoot and undershoot when switching power in a pulse width modulation manner from an output of a single inverter source to plural inductive loads, each inductive load having a respective resonant frequency, the inverter source set for outputting a set amount of power, the method comprising the steps of:

(a) during a first switching cycle
  (i) presetting an initial time delay value which represents the time between when a respective load is switched to receive the inverter source power and when the inverter source is triggered to actually provide the power;
  (ii) measuring a maximum amount of overshoot and/or undershoot which occurs when switching to a successive load, the overshoot and/or undershoot representing drawing by the load of an amount of power greater or less than the amount of power set for outputting by the inverter;
  (iii) determining a time delay value for each load which will correct the overshoot and/or undershoot;
  (iv) loading the time delay values for each load into a memory; and (b) during subsequent switching cycles
  (i) retrieving the time delay values upon switching of the respective load to receive the inverter source power; and
  (ii) setting a new time delay value using the value for the respective load, thereby reducing subsequent amounts of overshoot and/or undershoot.

24. A method according to claim 23, wherein the new time delay value represents an increase or decrease from the preset initial time delay value.

25. A method according to claim 23, wherein step (b) further includes the step of (iii) measuring a maximum amount of overshoot and/or undershoot to ascertain whether a new value should be determined and loaded into the memory; and (iv) determining and loading the new value if the overshoot and/or undershoot are outside preselected limits.

26. A method for switching power according to claim 23, wherein the time delay value in step (a)(i) and step (b)(ii) is the time period required for a time delay source to generate and output a triggering signal, the triggering signal causing the inverter source to provide its power to the load switched to receive the power.

27. A method according to claim 26, wherein the time delay source includes a control voltage level, the time delay source generating and outputting the triggering signal upon attaining the control voltage level.

28. A method according to claim 27, wherein the control voltage level is determined in accordance with the formula $$V_{new} = \frac{V_{old}}{2}\left(1 + \frac{P_2}{P_1}\right)$$

where:

$V_{old}$ is the original control voltage;

$V_{new}$ is the control voltage for the successive inductive load;

$P_1$ is the set power amount of the inverter source; and $P_2$ is the power amount of overshoot or undershoot, and wherein the initial time delay value in step (a)(i) is associated with $V_{old}$ and the new time delay value in step (b)(ii) is associated with $V_{new}$.

29. A method according to claim 28, wherein the equation in the formula is performed during the first switching cycle.

30. A method according to claim 23, wherein during the first switching cycle, the inverter source outputs an amount of power less than the set amount of power.

31. A control system according to claim 1, further comprising (e) means for reducing the mount of power output from the inverter power supply during a first switching cycle among the plural inductive loads.

32. A control system according to claim 12, further comprising (f) means for reducing the amount of power set for outputting from the inverter source during a first switching cycle among the plural inductive loads.

* * * * *